(12) United States Patent
Noh et al.

(10) Patent No.: US 12,202,729 B2
(45) Date of Patent: Jan. 21, 2025

(54) METHOD FOR PREPARING GRAPHENE NANOSHEET

(71) Applicant: LG ENERGY SOLUTION, LTD., Seoul (KR)

(72) Inventors: Suk In Noh, Daejeon (KR); Sang Wook Woo, Daejeon (KR); Chang Ju Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 326 days.

(21) Appl. No.: 17/769,872

(22) PCT Filed: Oct. 23, 2020

(86) PCT No.: PCT/KR2020/014559
§ 371 (c)(1),
(2) Date: Apr. 18, 2022

(87) PCT Pub. No.: WO2021/096094
PCT Pub. Date: May 20, 2021

(65) Prior Publication Data
US 2022/0388849 A1    Dec. 8, 2022

(30) Foreign Application Priority Data

Nov. 15, 2019   (KR) .......................... 10-2019-0146770

(51) Int. Cl.
*C01B 32/184*    (2017.01)
*B82Y 30/00*    (2011.01)
(Continued)

(52) U.S. Cl.
CPC ............ *C01B 32/184* (2017.08); *B82Y 30/00* (2013.01); *B82Y 40/00* (2013.01); *C01B 32/225* (2017.08);
(Continued)

(58) Field of Classification Search
CPC . C01B 32/184; C01B 32/225; C01B 2204/22; C01B 2204/32; C01B 32/19;
(Continued)

(56) References Cited

U.S. PATENT DOCUMENTS

2013/0102084 A1    4/2013   Loh et al.
2014/0027299 A1    1/2014   Loh et al.
(Continued)

FOREIGN PATENT DOCUMENTS

CN    102372268 A    3/2012
CN    102701187 A    10/2012
(Continued)

OTHER PUBLICATIONS

Chen et al., "Direct exfoliation of the anode graphite of used Li-ion batteries into few-layer graphene sheets: a green and high yield route to high-quality graphene preparation", Journal of Materials Chemistry A, 2017, vol. 5, pp. 5880-5885.
(Continued)

*Primary Examiner* — Daniel C. McCracken
(74) *Attorney, Agent, or Firm* — Birch, Stewart, Kolasch & Birch, LLP

(57) ABSTRACT

A method for preparing a graphene nanosheet, wherein the method includes preparing an electrode assembly comprising a negative electrode, wherein the negative electrode comprises artificial graphite, a lithium metal counter electrode opposing the negative electrode, and a separator interposed between the negative electrode and the lithium metal counter electrode, and immersing the electrode assembly in an electrolyte, electrochemically charging the immersed electrode assembly to form a charged electrode assembly, separating the artificial graphite from the charged electrode assembly to form separated artificial graphite, and de-laminating a graphene nanosheet from the separated artificial
(Continued)

graphite, wherein the initial discharge capacity of the negative electrode is 350 mAh/g or greater, and the electrolyte comprises an organic solvent comprising a cyclic carbonate and a linear carbonate, and a lithium salt.

11 Claims, 5 Drawing Sheets

(51) Int. Cl.
 *B82Y 40/00* (2011.01)
 *C01B 32/225* (2017.01)
(52) U.S. Cl.
 CPC ...... *C01B 2204/22* (2013.01); *C01B 2204/32* (2013.01); *C01P 2004/61* (2013.01)
(58) Field of Classification Search
 CPC ... C01B 32/182; C01B 32/186; C01B 32/188; C01B 32/192; C01B 32/194; C01B 32/196; C01B 32/198; C01B 2204/00; C01B 2204/02; C01B 2204/04; C01B 2204/06; C01B 2204/065; C01B 2204/20; C01B 2204/24; C01B 2204/26; C01B 2204/28; C01B 2204/30; C01B 32/20; C01B 32/205; C01B 32/21; C01B 32/215; C01B 32/22; C01B 32/23; B82Y 30/00; B82Y 40/00; C01P 2004/61; Y02E 60/10
 See application file for complete search history.

(56) References Cited

U.S. PATENT DOCUMENTS

| | | | |
|---|---|---|---|
| 2014/0061059 A1 | 3/2014 | Dryfe et al. | |
| 2015/0275378 A1 | 10/2015 | Koo et al. | |
| 2015/0291431 A1 | 10/2015 | Tang et al. | |
| 2017/0233255 A1* | 8/2017 | Zhamu | C01B 32/19 205/413 |
| 2017/0260637 A1 | 9/2017 | Zhamu et al. | |
| 2017/0305747 A1 | 10/2017 | Yang et al. | |
| 2017/0373297 A1* | 12/2017 | Zhamu | H01M 50/451 |
| 2018/0072573 A1 | 3/2018 | Chaki et al. | |
| 2018/0244526 A1 | 8/2018 | Tang et al. | |
| 2020/0122108 A1* | 4/2020 | Kim | C01B 32/19 |

FOREIGN PATENT DOCUMENTS

| | | | |
|---|---|---|---|
| CN | 102815694 A | 12/2012 | |
| CN | 103058174 A | 4/2013 | |
| CN | 103964418 A | 8/2014 | |
| CN | 104768871 A | 7/2015 | |
| CN | 107108226 A | 8/2017 | |
| CN | 107902647 A | 4/2018 | |
| CN | 108502874 A | 9/2018 | |
| CN | 110444761 A | 11/2019 | |
| KR | 10-2013-0087018 A | 8/2013 | |
| KR | 10-2015-0056532 A | 5/2015 | |
| KR | 10-2015-0113728 A | 10/2015 | |
| KR | 10-2017-0015742 A | 2/2017 | |
| KR | 10-2017-0032655 A | 3/2017 | |
| KR | 10-2019-0005825 A | 1/2019 | |
| KR | 10-2019-0049837 A | 5/2019 | |
| WO | WO 2012/120264 A1 | 9/2012 | |
| WO | WO 2013/089842 A1 | 6/2013 | |
| WO | WO 2014/085241 A1 | 5/2014 | |
| WO | WO 2017/196037 | * 11/2017 | ........... C01B 32/182 |

OTHER PUBLICATIONS

International Search Report (PCT/ISA/210) Issued in PCT/KR2020/014559 mailed on Jan. 29, 2021.
Kim et al., "Electrochemical Properties of Natural Graphite coated with PFO-based Pitch for Lithium-ion Battery Anode", Korean Chemical Engineering Research, 2019, vol. 57, No. 5, pp. 672-678.
Li et al., "Lithium oxalyldifluoroborate/carbonate electrolytes for LiFePO$_4$/artificial graphite lithium-ion cells", Journal of Power Sources, 2010, vol. 195, No. 16, pp. 5344-5350.
Wang et al., "High-Yield Synthesis of Few-Layer Graphene Flakes through Electrochemical Expansion of Graphite in Propylene Carbonate Electrolyte", Journal of the American Chemical Society, 2011, vol. 133, No. 23, pp. 8888-8891.
Yu et al., "Electrochemical exfoliation of graphite and production of functional graphene", Current Opinion in Colloid & Interface Science, 2015, vol. 20, Issue 5-6, pp. 329-338.
Extended European Search Report for European Application No. 20888433.8, dated Oct. 24, 2022.

* cited by examiner

[FIG. 1]
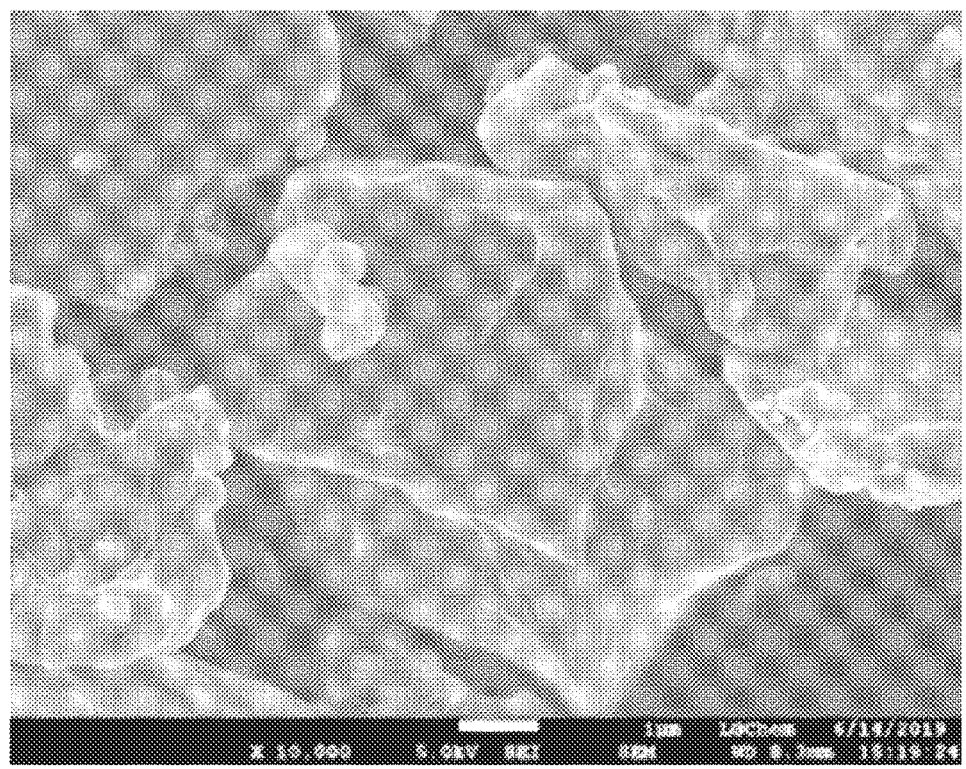

[FIG. 2]
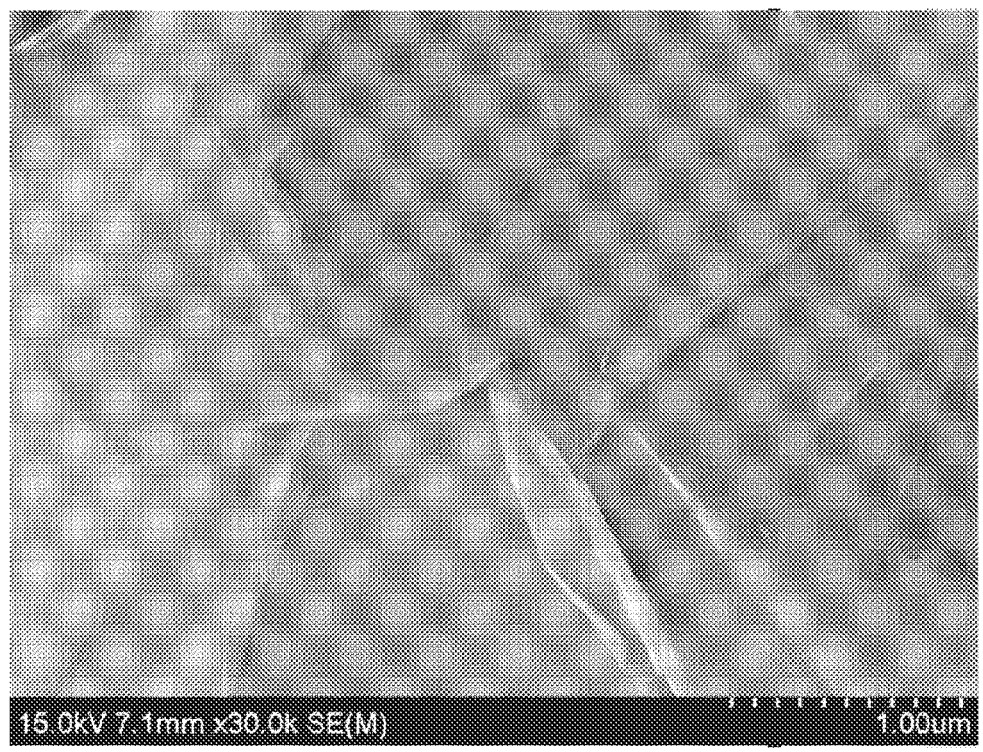

[FIG. 3]
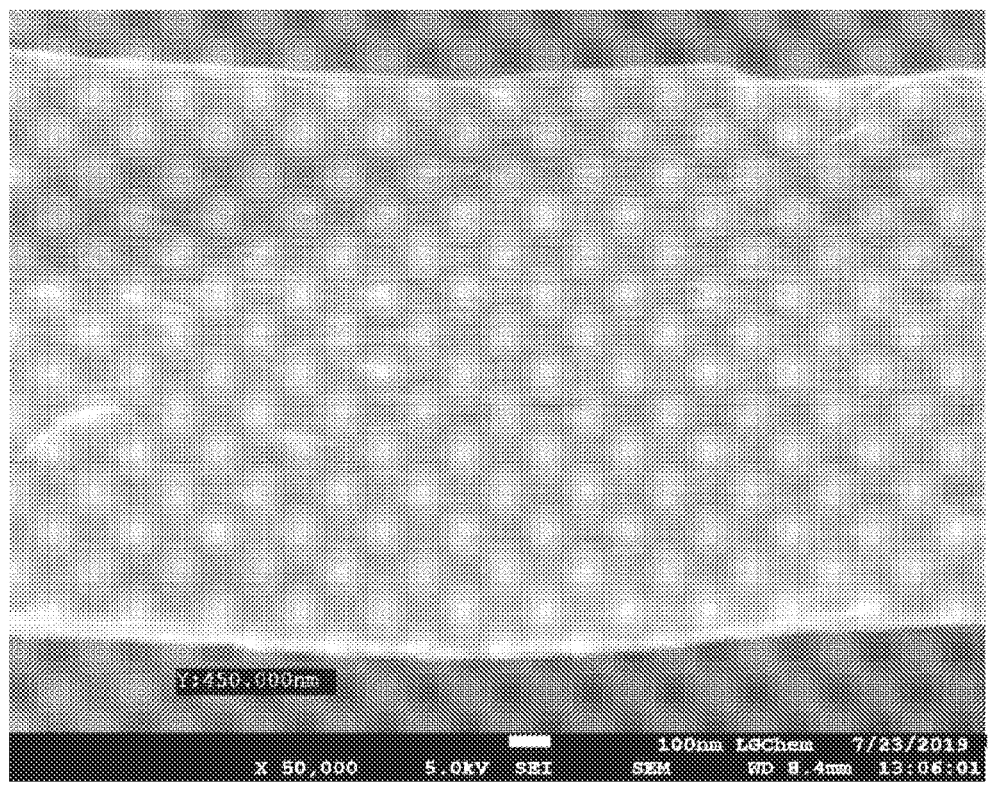

[FIG. 4]
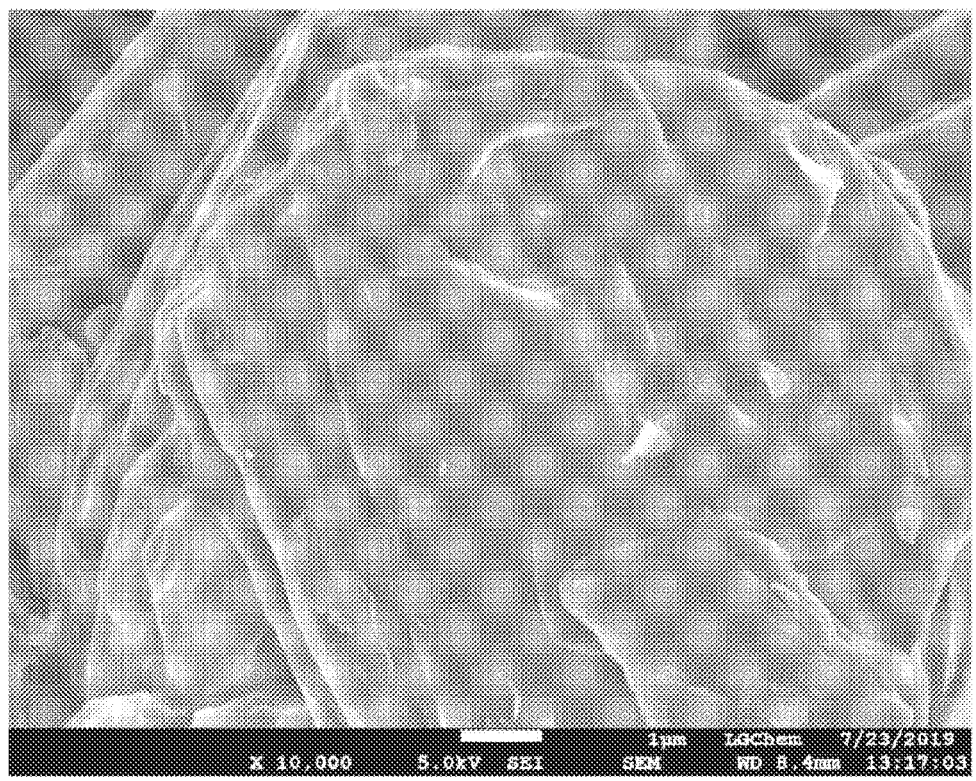

[FIG. 5]
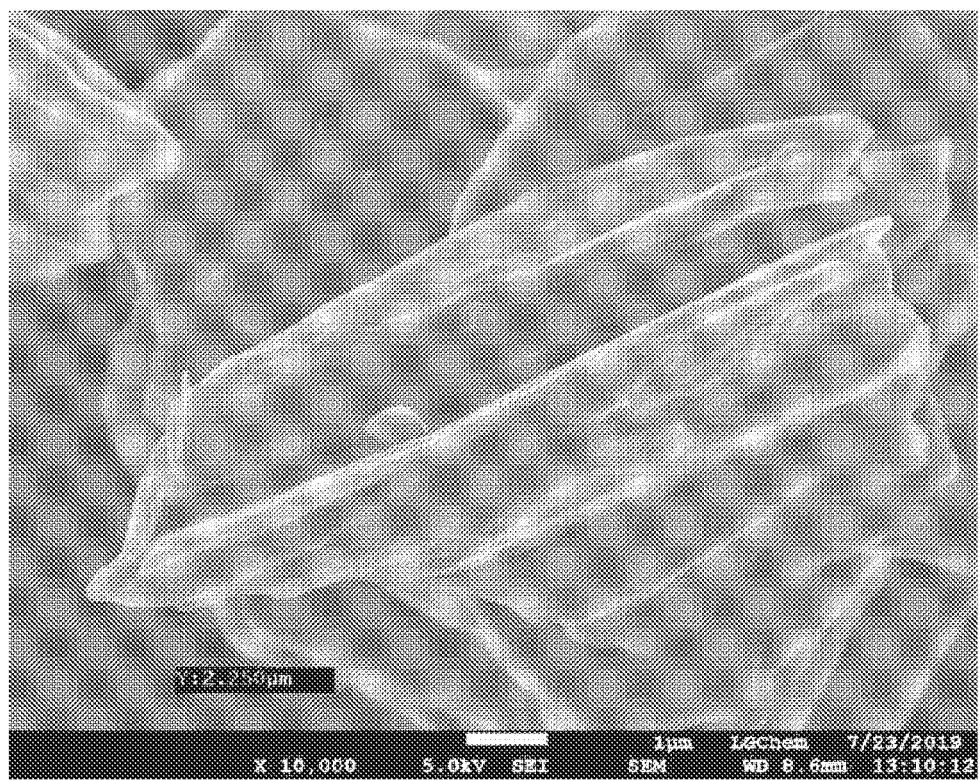

METHOD FOR PREPARING GRAPHENE NANOSHEET

CROSS-REFERENCE TO RELATED APPLICATIONS

This application claims the benefit of Korean Patent Application No. 10-2019-0146770, filed on Nov. 15, 2019, in the Korean Intellectual Property Office, the disclosure of which is incorporated herein in its entirety by reference.

TECHNICAL FIELD

The present invention relates to a method for preparing a graphene nanosheet.

BACKGROUND ART

Graphene is a material composed of carbon atoms, and is a single-layered carbon material in which carbon atoms are bonded to each other by $sp^2$ bonds and arranged in a honeycomb lattice.

The graphene has a high surface area, excellent electrical conductivity, optical properties, and mechanical properties, so that studies are being conducted for the application thereof in various fields such as transparent displays, light emitting materials, and electrode materials.

As a method for preparing graphene, a chemical de-lamination method using a graphite oxide (GO), a chemical vapor deposition method, a physical de-lamination method, and the like are typically known.

Specifically, the chemical de-lamination method using a graphite oxide is a method based on a solvent, and is a method in which an oxygen functional group is intercalated between graphene layers through the production of a graphite oxide and then the de-lamination of a graphene layer is induced by ultrasonic grinding and the like. The method advantageous in that it is economical and is able to mass-produce graphene, but since a strong acid is used for the oxidation of graphene, the method is disadvantageous in that the defect rate of graphene is high, and oxygen functional groups are not completely removed. In addition, the chemical vapor deposition method is a method in which a carbon source such as methane is supplied into a furnace and then heated to grow graphene on a metal catalyst substrate. The method is advantageous in that it is capable of synthesizing large-area graphene, but is disadvantageous in that the process is complex, difficult, and expensive.

Meanwhile, the physical de-lamination method is a method in which shear stress is applied to graphite and the like to de-laminate graphene. The method is advantageous in that it is possible to obtain high-quality graphene, but is disadvantageous in that a high level of stress is required to de-laminate graphene from graphite and the like, and the yield is not high.

Therefore, there is a demand for the development of a method capable of preparing high-quality graphene or a graphene nanosheet through a simpler process.

Korean Patent Laid-open Publication No. 10-2017-0032655 discloses a method for preparing graphene using eutectic graphite, but has a limitation in solving the above-mentioned problems.

PRIOR ART DOCUMENT

Patent Document

Korean Patent Laid-open Publication No. 10-2017-0032655

DISCLOSURE OF THE INVENTION

Technical Problem

An aspect of the present invention provides a method for preparing a graphene nanosheet, the method capable of obtaining a graphene nanosheet having excellent quality even under low pressure and temperature conditions.

Technical Solution

According to an aspect of the present invention, there is provided a method for preparing a graphene nanosheet, wherein the method includes preparing an electrode assembly including a negative electrode containing artificial graphite, a lithium metal counter electrode opposing the negative electrode, and a separator interposed between the negative electrode and the lithium metal counter electrode, and immersing the electrode assembly in an electrolyte, electrochemically charging the immersed electrode assembly, separating the artificial graphite from the charged electrode assembly, and de-laminating a graphene nanosheet from the separated artificial graphite, wherein the initial discharge capacity of the negative electrode is 350 mAh/g or greater, and the electrolyte comprises an organic solvent comprising a cyclic carbonate and a linear carbonate, and a lithium salt.

Advantageous Effects

A method for preparing a graphene nanosheet of the present invention is characterized in that a negative electrode having an initial discharge capacity of 350 mAh/g or greater is immersed in an electrolyte including an organic solvent containing a cyclic carbonate and a linear carbonate and electrochemically charged, and then a graphene nanosheet is de-laminated from the charged negative electrode. Artificial graphite included in the negative electrode has a high degree of graphitization, and a complex of lithium and the cyclic carbonate derived from the electrolyte during the electrochemical charge may expand gaps between graphene layers in the artificial graphite. Accordingly, the method for preparing a graphene nanosheet according to the present invention is capable of smoothly de-laminating a graphene nanosheet from artificial graphite even under a low-pressure condition, and preparing a high-quality graphene nanosheet.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

FIG. 1 is a photograph of the appearance a graphene nanosheet prepared in Example 1 observed by a scanning electron microscope (SEM);

FIG. 2 is a photograph of the appearance a graphene nanosheet prepared in Example 3 observed by a scanning electron microscope;

FIG. 3 is a photograph of the appearance a graphene nanosheet prepared in Comparative Example 1 observed by a scanning electron microscope;

FIG. 4 is a photograph of the appearance a graphene nanosheet prepared Comparative Example 2 observed by a scanning electron microscope; and FIG. 5 is a photograph of the appearance a graphene nanosheet prepared Comparative Example 3 observed by a scanning electron microscope.

MODE FOR CARRYING OUT THE INVENTION

It will be understood that words or terms used in the specification and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

The terminology used herein is for the purpose of describing particular exemplary embodiments only and is not intended to be limiting of the present invention. The terms of a singular form may include plural forms unless the context clearly indicates otherwise.

It will be further understood that the terms "include", "comprise", or "have" when used in this specification, specify the presence of stated features, numbers, steps, elements, or combinations thereof, but do not preclude the presence or addition of one or more other features, numbers, steps, elements, or combinations thereof.

In the present specification, an average particle diameter ($D_{50}$) may be defined as a particle diameter corresponding to 50% of the volume accumulation in a particle diameter distribution curve of a particle. The average particle diameter ($D_{50}$) may be measured by, for example, a laser diffraction method. The laser diffraction method generally enables measurement of a particle diameter from a submicron region to several millimeters, so that results of high reproducibility and high resolution may be obtained.

In the present specification, a "graphene nanosheet" may be understood as a concept encompassing a single-layered graphene and a multi-layered graphene. At this time, the multi-layered graphene is a structure in which a plurality of single-layered graphenes are stacked, and may have a thickness of, for example, 0.1 nm to 50 nm.

Hereinafter, the present invention will be described in detail.

<Method for Preparing Graphene Nanosheet>

A method for preparing a graphene nanosheet of the present invention includes preparing an electrode assembly comprising a negative electrode, wherein the negative electrode comprises artificial graphite, a lithium metal counter electrode opposing the negative electrode, and a separator interposed between the negative electrode and the lithium metal counter electrode, and immersing the electrode assembly in an electrolyte, electrochemically charging the immersed electrode assembly to form a charged electrode assembly, separating the artificial graphite from the charged electrode assembly to form separated artificial graphite, and de-laminating a graphene nanosheet from the separated artificial graphite, wherein the initial discharge capacity of the negative electrode is 350 mAh/g or greater, and the electrolyte comprises an organic solvent comprising a cyclic carbonate and a linear carbonate, and a lithium salt.

The method for preparing a graphene nanosheet of the present invention uses artificial graphite as a raw material for obtaining graphene, and is characterized in that the initial discharge capacity of a negative electrode including the artificial graphite is 350 mAh/g or greater. Artificial graphite, which enables the initial discharge capacity of the above range to be achieved, has a high capacity, a high degree of crystallization, and a high degree of graphitization, and has a narrow gap between graphene layers. When the negative electrode including the artificial graphite is injected with an electrolyte solution including a cyclic carbonate and a linear carbonate and subjected to electrochemical charging, a lithium-cyclic carbonate complex in the electrolyte may be intercalated between graphene layers in the artificial graphite to expand gaps between the graphene layers, and may lower the bonding force between the graphene layers. Therefore, according to the method for preparing a graphene nanosheet of the present invention, it is possible to prepare graphene or a graphene nanosheet having high quality even under a low pressure condition.

<Preparation of Electrode Assembly and Electrolyte Immersion Step>

The method for preparing a graphene nanosheet of the present invention includes preparing an electrode assembly including a negative electrode containing artificial graphite, a lithium metal counter electrode opposing the negative electrode, and a separator interposed between the negative electrode and the lithium metal counter electrode, and immersing the electrode assembly in an electrolyte.

The electrode assembly includes a negative electrode, and the negative electrode includes artificial graphite.

The artificial graphite may be provided as a raw material for obtaining a graphene nanosheet. In addition, the artificial graphite may be provided as a negative electrode active material in which the intercalation/de-intercalation of lithium occurs during electrochemical charge of the negative electrode to be described later.

The artificial graphite may be a secondary artificial graphite particle formed by the agglomeration of two or more primary artificial graphite particles.

The primary artificial graphite particles may be formed after pulverizing a carbon precursor. Specifically, the primary artificial graphite particles may be formed by pulverizing a carbon precursor and then filling obtained powder into a device, following by heating the powder to 1,500° C. to 3,200° C. The carbon precursor may be one or more selected from the group consisting of coal-based heavy oil, fiber-based heavy oil, tar, pitch, and coke. Powder of primary artificial graphite particles formed from a pulverized carbon precursor may agglomerate better, so that it is possible to preferably form primary artificial graphite particles having high hardness.

When the artificial graphite is a secondary artificial graphite particle formed by the agglomeration of two or more primary artificial graphite particles, the secondary artificial graphite particles may be formed by introducing primary artificial graphite particles into a reactor, and then spinning the primary artificial graphite particles to allow the primary artificial graphite particles to agglomerate together by centrifugal force. In the process of agglomerating primary artificial graphite particles, pitch and the like and a resin binder may be added to the reactor together with the primary artificial graphite particles, and then heat-treated at a temperature of about 1,400° C. to 1,600° C.

When the artificial graphite is a secondary artificial graphite particle formed by the agglomeration of two or more primary artificial graphite particles, the average particle diameter ($D_{50}$) of the primary artificial graphite particles may be 0.5 μm to 20 μm, preferably 3 μm to 10 μm.

The average particle diameter ($D_{50}$) of the artificial graphite may be 1 μm to 50 μm, preferably 5 μm to 30 μm. When in the above range, it is possible to form a uniform electrode assembly and to stably charge artificial graphite, so that it is preferable in terms of facilitating the de-lamination of a graphene nanosheet.

The negative electrode may include a negative electrode current collector, and a negative electrode active material layer formed on the negative electrode current collector. At this time, the artificial graphite is included in the negative electrode active material layer.

The negative electrode current collector is not particularly limited as long as it has conductivity without causing a chemical change in the battery. Specifically, copper, stainless steel, aluminum, nickel, titanium, fired carbon, copper or stainless steel that is surface-treated with one of carbon, nickel, titanium, silver, and the like, an aluminum-cadmium alloy, and the like may be used as the negative electrode current collector.

The negative electrode current collector may typically have a thickness of 3 μm to 500 μm, preferably 10 μm to 50 μm.

The negative electrode current collector may have microscopic irregularities formed on the surface thereof to improve the adhesion of the negative electrode active material. For example, the negative electrode current collector may be used in various forms such as a film, a sheet, a foil, a net, a porous body, a foam, and a non-woven body.

The negative electrode active material layer is formed on the negative electrode current collector.

The negative electrode active material layer includes the artificial graphite.

The artificial graphite may be included in the negative electrode active material layer in an amount of 80 wt % to 99 wt %, preferably 90 wt % to 98 wt %.

The negative electrode active material layer may include a binder.

In terms of further improving electrode adhesion, the binder may include at least one selected from the group consisting of styrene butadiene rubber (SBR), acrylonitrile butadiene rubber, acrylic rubber, butyl rubber, fluoro rubber, carboxymethyl cellulose (CMC), starch, hydroxypropyl cellulose, regenerated cellulose, polyvinyl alcohol (PVA), polyacrylic acid (PAA), polyethylene glycol (PEG), polyacrylonitrile (PAN), and polyacryl amide (PAM), and preferably, may include styrene butadiene rubber.

The binder may be included in a negative electrode active material layer in an amount of 0.5 wt % to 10 wt %. When in the above range, it is preferable in terms of increasing the ratio of the artificial graphite included in a negative electrode to increase the production amount of a graphene nanosheet while improving the adhesion between the artificial graphite and the negative electrode current collector.

The negative electrode active material layer may include a conductive material. The conductive material may be used to improve conductivity of a negative electrode, and a conductive material which has conductivity without causing a chemical change is preferred. Specifically, the conductive material may be at least one selected from the group consisting of natural graphite, artificial graphite, carbon black, acetylene black, Ketjen black, channel black, furnace black, lamp black, thermal black, conductive fiber, fluorocarbon powder, aluminum powder, nickel powder, zinc oxide, potassium titanate, titanium oxide, and a polyphenylene derivative, and may preferably include carbon black in terms of implementing high conductivity.

The conductive material may be included in the negative electrode active material layer in an amount of 0.5 wt % to 10 wt %.

The negative electrode active material layer may further include a thickener, and specifically, the thickener may be carboxymethyl cellulose (CMC).

The thickness of the negative electrode active material layer may be 30 μm to 200 μm, preferably 40 μm to 80 μm.

The negative electrode may be manufactured by dispersing artificial graphite, and selectively a binder, a conductive material and/or a thickener in a solvent for forming a negative electrode slurry to prepare a negative electrode slurry, coating the negative electrode slurry on the negative electrode current collector, followed by drying and roll-pressing.

The solvent for forming a negative electrode slurry may include at least one selected from the group consisting of distilled water, ethanol, methanol, and isopropyl alcohol, preferably distilled water, in terms of facilitating the dispersion of components.

The loading amount of the negative electrode may be 0.1 mg/cm$^2$ to 1,000 mg/cm$^2$, preferably 3 mg/cm$^2$ to 50 mg/cm$^2$. In this case, it is preferable in terms of uniformly intercalating a lithium-cyclic carbonate complex to be described later into the artificial graphite in the negative electrode when charging the negative electrode.

The lithium metal counter electrode opposes the negative electrode, and may function as a counter electrode for the negative electrode.

The separator is interposed between the negative electrode and the lithium metal counter electrode to separate the negative electrode and the lithium metal counter electrode and provide a movement path for lithium ions.

Specifically, as the separator, a porous polymer film, for example, a porous polymer film manufactured using a polyolefin-based polymer such as an ethylene homopolymer, a propylene homopolymer, an ethylene/butene copolymer, an ethylene/hexene copolymer, and an ethylene/methacrylate copolymer, or a laminated structure having two or more layers thereof may be used. In addition, as the separator, a typical porous non-woven fabric, for example, a non-woven fabric formed of glass fiber having a high melting point, polyethylene terephthalate fiber, or the like may be used. Furthermore, as the separator, a coated separator including a ceramic component or a polymer material may be used to secure heat resistance or mechanical strength, and may be used in a single-layered or a multi-layered structure, selectively.

In the electrode assembly, the initial discharge capacity of the negative electrode is 350 mAh/g or greater.

The initial discharge capacity of the negative electrode may be the discharge capacity of a negative electrode measured when the electrode assembly is charged and discharged under the following charging and discharging conditions for 1 cycle.

Charging condition: 0.1 C, CC/CV(1.5 V, 0.05 C cut-off)
Discharging condition: 0.1 C, CC(0.05 V cut-off)

When the initial discharge capacity of the negative electrode is 350 mAh/g or greater, it can be evaluated that the degree of graphitization and crystallinity of artificial graphite is high, and interlayer gaps in the artificial graphite is narrow. Accordingly, a lithium-cyclic carbonate complex (solvated lithium ions) to be described later may be intercalated between graphene layers of the artificial graphite to expand interlayer gaps, and weaken bonding force between the graphene layers to smoothly perform the de-lamination of a graphene nanosheet even under a low pressure condition. If the initial discharge capacity of the negative electrode is less than 350 mAh/g, the interlayer gaps of the artificial graphite are not sufficiently narrow, so that the effect of expanding the interlayer gaps may not be exhibited even when the lithium-cyclic carbonate complex is intercalated between the graphene layers.

Specifically, the initial discharge capacity of the negative electrode may be 350 mAh/g to 375 mAh/g, preferably 352 mAh/g to 365 mAh/g. When in the above range, a lithium-cyclic carbonate complex (solvated lithium ions) can more smoothly expand interlayer gaps between graphene layers, so that it is preferable in terms of being able to easily obtain a graphene nanosheet.

The initial discharge capacity of the negative electrode may be measured through a process to be described later and independent from the method for preparing a graphene nanosheet. Specifically, after the electrode assembly is prepared, charging and discharging process are performed to measure the initial discharge capacity of the negative electrode, and an electrode assembly having the same components and composition may be separately prepared to prepare a graphene nanosheet.

After the electrode assembly is prepared, the electrode assembly is immersed in an electrolyte.

The immersion of the electrode assembly may be performed at 15° C. to 30° C. for 15 hours to 45 hours, and when an electrode assembly is immersed at the above temperature for the above duration, it is preferable in terms of allowing the electrode assembly to be sufficiently wetted in the electrolyte.

The electrolyte includes an organic solvent containing a cyclic carbonate and a linear carbonate, and a lithium salt.

Any compound may be used as the lithium salt without particular limitation as long as it may provide lithium ions used in an electrode assembly or a battery. Specifically, as the lithium salt, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, $LiB(C_2O_4)_2$, or the like may be used. The lithium salt may be used in a concentration range of 0.1 M to 2.0 M. When the concentration of the lithium salt is in the above range, the electrolyte has suitable conductivity and viscosity, thereby exhibiting excellent performance, and lithium ions may effectively move.

The organic solvent includes a cyclic carbonate and a linear carbonate.

The cyclic carbonate may form lithium ions and a lithium-cyclic carbonate complex (solvated lithium ions) in an electrolyte by electrostatic attraction with lithium ions. Specifically, the lithium-cyclic carbonate complex may be formed as a cluster-shaped complex in which a plurality of cyclic carbonates are bonded to one lithium ion by electrostatic attraction. The above lithium-cyclic carbonate complex may be intercalated between graphene layers in the artificial graphite when performing an electrochemical charging process of a negative electrode to be described later, and the intercalated lithium-cyclic carbonate composite may serve to expand interlayer gaps between the graphene layers. In particular, artificial graphite in a negative electrode having an initial discharge capacity of 350 mAh/g or greater has a high degree of graphitization and narrow interlayer gaps, so that when the lithium-cyclic carbonate complex is intercalated into a graphene layer, the effect of expanding interlayer gaps of artificial graphite may be more dramatically exhibited, and the effect of weakening the bonding force between graphene layers in the artificial graphite may be exhibited. If a cyclic carbonate is not included in an organic solvent, the effect of widening or expanding interlayer gaps of graphene layers cannot be exhibited.

The cyclic carbonate may be at least one selected from the group consisting of ethylene carbonate (EC), propylene carbonate (PC), and butylene carbonate (BC), and more preferably, may be at least one of ethylene carbonate and propylene carbonate in terms of more preferably implementing the effect of widening interlayer gaps of graphene layers in artificial graphite since the bonding force between lithium ions and a cyclic carbonate is excellent when forming a cluster-shaped lithium-cyclic carbonate complex (solvated lithium ions).

The linear carbonate may improve the viscosity of the electrolyte in the organic solvent to an appropriate level and increase the conductivity of lithium ions. For the smooth de-lamination of a graphene nanosheet, a linear carbonate and a cyclic carbonate may be used together in an organic solvent, and if a linear carbonate is not used, it may be difficult for a lithium-cyclic carbonate complex (solvated lithium ions) to be smoothly intercalated into artificial graphite, so that it may be difficult to de-laminate a graphene nanosheet.

Specifically, the linear carbonate may be at least one selected from the group consisting of dimethyl carbonate (DMC), diethyl carbonate (DEC), dipropyl carbonate (DPC), ethyl methyl carbonate (EMC), methyl propyl carbonate (MPC), and ethyl propyl carbonate (EPC), and preferably, may be ethyl methyl carbonate.

The organic solvent may include the cyclic carbonate and the linear carbonate in a volume ratio of 15:85 to 85:15, preferably 30:70 to 70:30, and more preferably 35:65 to 45:55. When in the above range, a lithium-cyclic carbonate complex may be intercalated between graphene layers to expand gaps between the graphene layers, so that a graphene nanosheet having high quality and low thickness may be de-laminated.

The electrolyte may further include an additive. The additive may include at least one selected from the group consisting of fluoroethylene carbonate (FEC), vinylene carbonate (VC), polystyrene (PS), succinonitrile, ethylene glycol bis(propionitrile) ether, and lithium bis(fluorosulfonyl) imide (LiFSI), preferably fluoroethylene carbonate. The additive may be included in the electrolyte in an amount of 3 wt % or less, preferably 0.001 wt % to 2 wt % in terms of preventing a solid electrolyte interface layer (an SEI film) from being excessively formed on the surface of artificial graphite.

<Step of Charging Electrode Assembly>

The method for preparing a graphene nanosheet of the present invention includes a step of electrochemically charging the immersed electrode assembly.

By electrochemically charging the electrode assembly, a lithium-cyclic carbonate complex may be intercalated between graphene layers in artificial graphite to expand interlayer gaps of the graphene layers. When interlayer gaps of graphene layers are expanded, the bonding force between graphene layers may be weakened, so that the de-lamination of a graphene nanosheet may be smoothly performed even under a low pressure condition.

The electrochemical charging of the electrode assembly may be performed by subjecting the electrode assembly to an oxidation/reduction reaction using an electrochemical charge/discharge device.

The electrochemical charging of the electrode assembly may be performed at 0.1 C to 2 C, preferably 0.05 C to 1 C. When in the above range, a lithium-cyclic carbonate complex may be evenly and efficiently intercalated into artificial graphite when charging a negative electrode, and may prevent the problem in which a lithium-cyclic carbonate complex is not intercalated into artificial graphite but precipitated as a lithium metal when a negative electrode is charged at an excessively high C-rate.

The electrochemical charging of the electrode assembly may be performed such that the state of charge (SOC) of a negative electrode becomes 50% or greater, preferably 80% or greater, and more preferably 100% to allow a lithium-cyclic carbonate composite to be smoothly intercalated into artificial graphite.

<Step of Separating Artificial Graphite>

The method for preparing a graphene nanosheet of the present invention includes a step of separating the artificial graphite from the charged electrode assembly.

The artificial graphite separated from the electrode assembly is in the state in which gaps between graphene layers are expanded due to the electrochemical charge of the electrode assembly, and a graphene nanosheet may be obtained from the artificial graphite by a de-lamination process of a graphene nanosheet to be described later.

The separation of artificial graphite may be performed by the steps of recovering a negative electrode (or a negative electrode active material layer) from the electrode assembly, immersing the negative electrode (or the negative electrode active material layer) in deionized water, and subjecting the immersed negative electrode (or the immersed negative electrode active material layer) to ultrasonic treatment to separate artificial graphite.

Artificial graphite may be separated by the ultrasonic treatment and may be dispersed in the deionized water.

The method for preparing a graphene nanosheet of the present invention may further include, before the step of separating artificial graphite, recovering a negative electrode (or a negative electrode active material layer) from the electrode assembly, and then washing the negative electrode (or the negative electrode active material layer). Through the above washing step, an SEI film which may be formed on the surface of artificial graphite by an electrochemical charging process may be removed, so that the de-lamination of a graphene nanosheet may be more smoothly performed.

<Step of De-Laminating Graphene Nanosheet>

The method for preparing a graphene nanosheet of the present invention includes a step of de-laminating a graphene nanosheet from the separated artificial graphite.

The artificial graphite separated from the electrode assembly is in the state in which gaps between graphene layers are expanded due to the electrochemical charge of the electrode assembly, and a graphene nanosheet may be obtained from the artificial graphite by the de-lamination process of a graphene nanosheet.

Specifically, the step of de-laminating a graphene nanosheet may be performed by a method including the following steps:

(a) forming a dispersion solution including the separated artificial graphite; and (b) allowing the dispersion solution to continuously pass through an inlet of a high-pressure homogenizer including the inlet, an outlet, and a micro-channel connecting the inlet and the outlet, wherein a graphene nanosheet is de-laminated from the artificial graphite.

According to the above method, the graphene nanosheet may be de-laminated from the artificial graphite by shearing force in the high-pressure homogenizer. In the case of the above method, a process for graphene nanosheet de-lamination is simplified and a process causing defects in graphene such as acid treatment is not involved, so that it is possible to prepare graphene with fewer defects. In addition, in the case of the above method, there is an advantage in that graphene has fewer defects and excellent electrical conductivity compared to a method for de-laminating graphene by ultrasonic treatment, a method for obtaining graphene by preparing oxidized graphite and re-reducing the same, and the like.

The step of de-laminating a graphene nanosheet includes (a) forming a dispersion solution in which the separated artificial graphite is dispersed.

The dispersion solution may be one in which the artificial graphite is dispersed in an aqueous solvent or polar organic solvent. The aqueous solvent or polar organic solvent may be one or more selected from the group consisting of water, NMP, acetone, N,N-dimethylformamide (DMF), Dimethyl sulfoxide (DMSO), ethanol, isopropyl alcohol, methanol, butanol, 2-ethoxy ethanol, 2-butoxy ethanol, 2-methoxy propanol, tetrahydrofuran (THF), ethylene glycol, pyridine, dimethylacetamide, N-vinylpyrrolidone, methyl ethyl ketone (butanone), alpha-terpinol, formic acid, ethyl acetate, and acrylonitrile.

The dispersion solution may further include a dispersant to facilitate the dispersion of the artificial graphite.

As the dispersant, any material which has been known to be used to uniformly disperse various carbon-based materials in a polar solvent, such as tannic acid, polyacrylic acid, carboxymethyl cellulose, or trade name Triton X-100 or Pluronics F-127, and the like, may be used.

Specifically, the dispersant may be carboxymethyl cellulose having a weight average molecular weight of 20,000 or less, specifically 100 to 15,000.

The step of de-laminating a graphene nanosheet includes (b) allowing the dispersion solution to continuously pass through an inlet of a high-pressure homogenizer including the inlet, an outlet, and a micro-channel connecting the inlet and the outlet, thereby de-laminating a graphene nanosheet from the artificial graphite.

The high-pressure homogenizer may include an inlet into which a dispersion solution is injected, a micro-channel through which the injected dispersion solution is continuously passed, and an outlet through which a graphene nanosheet prepared in the micro-channel is obtained. The artificial graphite may pass through the micro-channel under the application of shearing force to be de-laminated, thereby forming a graphene nanosheet having a nano-scale thickness. When a graphene nanosheet is prepared in the high-pressure homogenizer, it is possible to continuously obtain a graphene nanosheet without a separate pre-treatment process, so that it is possible to mass produce graphene nanosheets having no defects, thereby having excellent electrical conductivity.

The dispersion solution may be introduced into the inlet of the high-pressure homogenizer under a pressure of 100 bar to 2,500 bar, more preferably 150 bar to 1,000 bar and the dispersion solution passes through the micro-channel. According to the present invention, artificial graphite separated from a negative electrode having an initial discharge capacity of 350 mAh/g is used as a raw material of a graphene nanosheet, so that a graphene nanosheet may be smoothly de-laminated even at a low level of pressure, and the occurrence of damage and defects in graphene caused by the de-lamination of graphene under a high pressure condition is prevented, so that it is possible to de-laminate a graphene nanosheet having high quality.

The diameter of the micro-channel may be about 1 mm or less, preferably 10 to 800 μm, and when the dispersion solution is passed through in the above range, high shearing force may be implemented. Such shearing force facilitates de-lamination between carbon atomic layers in which carbon atoms are bonded by Van der Waals bonding rather than in the Basal plane of a graphite-based material forming a covalent bond, so that a graphene nanosheet which is thin and is low in defects may be effectively formed.

The step (b) may be performed for a plurality of times. Specifically, the step (b) may be repeatedly performed for 10 minutes or more, preferably 10 minutes to 180 minutes.

Hereinafter, Examples of the present invention will be described in detail so that those skilled in the art may easily carry out the present invention. However, the present invention may be embodied in many different forms, and is not limited to Examples set forth herein.

EXAMPLES

Example 1

<Preparation of Electrode Assembly to Measure Initial Discharge Capacity of Negative Electrode, and Measurement of Initial Discharge Capacity>

Artificial graphite in the form of secondary particles (Average particle diameter ($D_{50}$): 20 μm), styrene-butadiene rubber (SBR) as a binder, carbon black as a conductive material, and carboxymethyl cellulose (CMC) as a thickener were mixed in a weight ratio of 94:2:2:2, and the mixture was added to distilled water as a solvent for forming a negative electrode slurry to prepare a negative electrode slurry. The negative electrode slurry was coated on one surface of a copper current collector (Thickness: 20 μm), which is a negative electrode current collector, with a loading amount of 5 mg/cm², roll-pressed, and then dried in a vacuum oven at 130° C. for 10 hours to form a negative electrode active material layer (Thickness: 100 μm), thereby manufacturing a negative electrode.

A lithium metal was used as a counter electrode opposing the negative electrode, and a polyethylene separator was interposed between the negative electrode and the lithium metal counter electrode, and an electrolyte was injected thereto to prepare an electrode assembly.

As the electrolyte, one prepared by dissolving $LiPF_6$ to a concentration of 1 M in an organic solvent in which ethylene carbonate (EC) and ethyl methyl carbonate (EMC) were mixed in a volume ratio of 40:60 was used.

The electrode assembly prepared above was charged and discharged under the following charge/discharge conditions through an electrochemical charge/discharge device, and the initial discharge capacity of the negative electrode was specified. The initial discharge capacity of the negative electrode was 350 mAh/g.

Charging condition: 0.1 C, CC/CV(1.5 V, 0.05 C cut-off)
Discharging condition: 0.1 C, CC(0.05 V cut-off)
<Preparation of Electrode Assembly and Electrolyte Solution Immersion>

The same electrode assembly as the electrode assembly for measuring the initial discharge capacity of a negative electrode prepared above was separately prepared.

The electrode assembly prepared above was immersed in an electrolyte at 20° C. for 30 hours.

As the electrolyte, one prepared by dissolving $LiPF_6$ to a concentration of 1 M in an organic solvent in which ethylene carbonate (EC) and ethyl methyl carbonate (EMC) were mixed in a volume ratio of 40:60 was used.
<Step of Charging Electrode Assembly>

The electrode assembly immersed in the electrolyte was electrochemically charged by an electrochemical charge/discharge device.

Specifically, the electrode assembly was electrochemically charged at 0.1 C until the SOC of the negative electrode became 100%.
<Step of Separating Artificial Graphite>

A negative electrode active material layer was recovered from the charged electrode assembly, and the negative electrode active material layer was washed with dimethyl carbonate (DMC).

The washed negative electrode active material layer was immersed in a dispersion solution containing deionized water, and carboxymethyl cellulose (CMC) having a weight average molecular weight (Mw) of 10,000 as a dispersant, and then subjected to ultrasonic treatment at room temperature (20° C.) for 5 minutes using an ultra-sonication equipment to separate artificial graphite. The separated artificial graphite was dispersed in a dispersion solution.
<Step of De-Laminating Graphene Nanosheet>

1 L of a dispersion solution in which the artificial graphite obtained above was dispersed was introduced into an inlet of a high-pressure homogenizer at a rate of 100 m/s under the application of a pressure of 300 bar to pass through a micro-channel, wherein the high-pressure homogenizer includes the inlet, an outlet, and the micro-channel (diameter: 10 μm) connecting between the inlet and the outlet. The above process was performed for 30 minutes. Through the above, a graphene nanosheet was de-laminated and recovered from the artificial graphite.

Example 2

A graphene nanosheet was prepared in the same manner as in Example 1 except that the pressure applied in the high-pressure homogenizer was 2,000 bar.

Example 3

<Preparation of Electrode Assembly to Measure Initial Discharge Capacity of Negative Electrode, and Measurement of Initial Discharge Capacity>

An electrode assembly was prepared in the same manner as in Example 1 except that artificial graphite (Average particle diameter ($D_{50}$): 20 μm) in the form of secondary particles different from Example 1 was used.

The electrode assembly prepared above was charged and discharged under the same charge/discharge conditions as in Example 1, and the initial discharge capacity of the negative electrode measured accordingly was 360 mAh/g.
<Preparation of Electrode Assembly and Electrolyte Solution Immersion> to <Step of De-Laminating Graphene Nanosheet>

The same electrode assembly as the electrode assembly for measuring the initial discharge capacity of a negative electrode prepared above was separately prepared.

A graphene nanosheet was prepared in the same manner as in Example 1 except that the electrode assembly prepared above was used.

Example 4

A graphene nanosheet was prepared in the same manner as in Example 1 except that the electrolyte contains ethylene carbonate (EC) and ethyl methyl carbonate (EMC) in a volume ratio of 60:40.

Example 5

A graphene nanosheet was prepared in the same manner as in Example 1 except that the electrolyte contains ethylene carbonate (EC) and ethyl methyl carbonate (EMC) in a volume ratio of 20:80.

Example 6

A graphene nanosheet was prepared in the same manner as in Example 1 except that the electrolyte contained ethylene carbonate (EC) and ethyl methyl carbonate (EMC) in a volume ratio of 80:20.

Comparative Example 1

<Preparation of Electrode Assembly to Measure Initial Discharge Capacity of Negative Electrode, and Measurement of Initial Discharge Capacity>

An electrode assembly was prepared in the same manner as in Example 1 except that artificial graphite (Average particle diameter ($D_{50}$): 20 μm) in the form of secondary particles different from Example 1 was used.

The electrode assembly prepared above was charged and discharged under the same charge/discharge conditions as in Example 1, and the initial discharge capacity of the negative electrode measured accordingly was 345 mAh/g.

<Preparation of Electrode Assembly and Electrolyte Solution Immersion> to <Step of De-Laminating Graphene Nanosheet>

The same electrode assembly as the electrode assembly for measuring the initial discharge capacity of a negative electrode prepared above was separately prepared.

The same method as in Example 1 was performed except that the electrode assembly prepared above was used.

Comparative Example 2

The same method as in Example 1 was performed except that the electrolyte contained only the ethyl methyl carbonate (EMC) as an organic solvent.

Comparative Example 3

The same method as in Example 1 was performed except that the electrolyte contained only the ethylene carbonate (EC) as an organic solvent.

Comparative Example 4

<Preparation of Electrode Assembly to Measure Initial Discharge Capacity of Negative Electrode, and Measurement of Initial Discharge Capacity>

An electrode assembly was prepared in the same manner as in Example 1 except that artificial graphite (Average particle diameter ($D_{50}$): 20 μm) in the form of secondary particles different from Example 1 was used.

The electrode assembly prepared above was charged and discharged under the same charge/discharge conditions as in Example 1, and the initial discharge capacity of the negative electrode measured accordingly was 340 mAh/g.

<Preparation of Electrode Assembly and Electrolyte Solution Immersion> to <Step of De-Laminating Graphene Nanosheet>

The same electrode assembly as the electrode assembly for measuring the initial discharge capacity of a negative electrode prepared above was separately prepared.

The same method as in Example 1 was performed except that the electrode assembly prepared above was used.

Comparative Example 5: Preparation of Graphene Nanosheet

The same method as in Comparative Example 4 was performed except that the pressure applied in the high-pressure homogenizer was 2,000 bar.

TABLE 1

| | Initial discharge capacity of negative electrode | Electrolyte ($LiPF_6$ 1 mol % contained) | | Applied pressure in high-pressure homogenizer |
|---|---|---|---|---|
| | (mAh/g) | EC (Vol %) | EMC (Vol %) | (bar) |
| Example 1 | 355 | 40 | 60 | 300 |
| Example 2 | 355 | 40 | 60 | 2,000 |
| Example 3 | 360 | 40 | 60 | 300 |
| Example 4 | 355 | 60 | 40 | 300 |
| Example 5 | 355 | 20 | 80 | 300 |
| Example 6 | 355 | 80 | 20 | 300 |
| Comparative Example 1 | 345 | 40 | 60 | 300 |
| Comparative Example 2 | 355 | 0 | 100 | 300 |
| Comparative Example 3 | 355 | 100 | 0 | 300 |
| Comparative Example 4 | 340 | 40 | 60 | 300 |
| Comparative Example 5 | 340 | 40 | 60 | 2,000 |

Experimental Example 1: SEM Observation Evaluation

In order to confirm the formation of a graphene nanosheet through the preparation process of each of Examples and Comparative Examples, the resultant product obtained through the preparation method of each of Example 1, Example 3, Comparative Example 1, Comparative Example 2, and Comparative Example 3 was dispersed in water, and mixed with graphite to prepare a coated sample of each of Example 1, Example 3, and Comparative Examples 1 to 3.

The graphene nanosheet prepared in each of Example 1, Example 3, Comparative Example 1, Comparative Example 2, and Comparative Example 3 was observed with a scanning electron microscope (SEM) and is sequentially shown in FIG. 1 to FIG. 5.

Referring to FIG. 1 and FIG. 2, it can be seen that a thin graphene nanosheet was formed on the graphite. However, in the case of Comparative Examples 1, 2, and 3, a graphene nanosheet was not observed.

Experimental Example 2: Evaluation of Sheet Resistance

The graphene nanosheet obtained in each of Examples and Comparative Examples was dispersed in deionized water, applied on copper foil, and then vacuum dried at 130° C. for 8 hours to prepare a graphene sheet (Size: 5 cm×5 cm).

The coating thickness of the sheet prepared above was measured, and the sheet resistance was measured at five points using a 4-point-probe. The average value thereof is shown in Table 2 below.

TABLE 2

|  | Sheet resistance (Ohm/cm$^2$) |
| --- | --- |
| Example 1 | 12.3 |
| Example 2 | 11.2 |
| Example 3 | 11.7 |
| Example 4 | 13.9 |
| Example 5 | 49.3 |
| Example 6 | 97.6 |
| Comparative Example 1 | No graphene nanosheet formed |
| Comparative Example 2 | No graphene nanosheet formed |
| Comparative Example 3 | No graphene nanosheet formed |
| Comparative Example 4 | No graphene nanosheet formed |
| Comparative Example 5 | 34.2 |

In Comparative Example 1 to Comparative Example 4, a graphene nanosheet was not formed. When the sheet resistance of the artificial graphite not having a graphene nanosheet was measured, the sheet resistance of Comparative Example 1 to Comparative Example 4 was respectively 571 Ohm/cm$^2$, 689 Ohm/cm$^2$, 917 Ohm/cm$^2$, and 956 Ohm/cm$^2$.

Referring to Table 2, Examples 1 to 6 in which the initial discharge capacity of the negative electrode in the electrode assembly was 350 mAh/g or greater, and a cyclic carbonate and a linear carbonate were used as an organic solvent showed significantly low sheet resistance. It can be evaluated that the lower the sheet resistance, the thinner and more uniform graphene nanosheet was de-laminated.

Comparative Example 5 showed relatively low sheet resistance, so that it can be seen that a graphene nanosheet was formed. However, it seems to be due to the fact that the pressure applied in the high-pressure homogenizer was excessively increased to about 2,000 bar. However, Comparative Example 5 has a problem in that the pressure applied in the high-pressure homogenizer is excessively high, so that there is a high risk of damage and defects in graphene during the de-lamination process of graphene.

The invention claimed is:

1. A method for preparing a graphene nanosheet, the method comprising:
   preparing an electrode assembly comprising a negative electrode, wherein the negative electrode comprises artificial graphite, a lithium metal counter electrode opposing the negative electrode, and a separator interposed between the negative electrode and the lithium metal counter electrode, and immersing the electrode assembly in an electrolyte;
   electrochemically charging the immersed electrode assembly to form a charged electrode assembly;
   separating the artificial graphite from the charged electrode assembly to form separated artificial graphite; and
   de-laminating a graphene nanosheet from the separated artificial graphite, wherein:
   the initial discharge capacity of the negative electrode is 350 mAh/g or greater; and
   the electrolyte comprises an organic solvent comprising a cyclic carbonate and a linear carbonate, and a lithium salt.

2. The method of claim 1, wherein the initial discharge capacity of the negative electrode is from 350 mAh/g to 375 mAh/g.

3. The method of claim 1, wherein the de-laminating of a graphene nanosheet is performed by a method comprising the following steps:
   (a) forming a dispersion solution in which the separated artificial graphite is dispersed; and
   (b) allowing the dispersion solution to continuously pass through an inlet of a high-pressure homogenizer comprising the inlet, an outlet, and a micro-channel connecting the inlet and the outlet, wherein a graphene nanosheet is de-laminated from the separated artificial graphite.

4. The method of claim 3, wherein the dispersion solution is introduced into the inlet of the high-pressure homogenizer under a pressure of 100 bar to 2,500 bar and the dispersion solution passes through the micro-channel.

5. The method of claim 3, wherein the step (b) is performed for about 10 minutes to 180 minutes.

6. The method of claim 1, wherein the immersing is performed for 15 hours to 45 hours at 15° C. to 30° C.

7. The method of claim 1, wherein the organic solvent comprises the linear carbonate and the cyclic carbonate in a volume ratio of 15:85 to 85:15.

8. The method of claim 1, wherein the cyclic carbonate is at least one selected from the group consisting of ethylene carbonate, propylene carbonate, and butylene carbonate.

9. The method of claim 1, wherein the linear carbonate is at least one selected from the group consisting of methyl carbonate, diethyl carbonate, dipropyl carbonate, ethyl methyl carbonate, methyl propyl carbonate, and ethyl propyl carbonate.

10. The method of claim 1, wherein the electrochemical charging of the electrode assembly is performed at 0.1 C to 2 C.

11. The method of claim 1, wherein an average particle diameter ($D_{50}$) of the artificial graphite is 1 μm to 50 μm.

* * * * *